Aug. 29, 1967    J. G. CAMACHO    3,338,154
MACHINE FOR THE PRODUCTION OF CHURROS AND SIMILAR FRITTERS
Filed Oct. 1, 1965    3 Sheets-Sheet 1
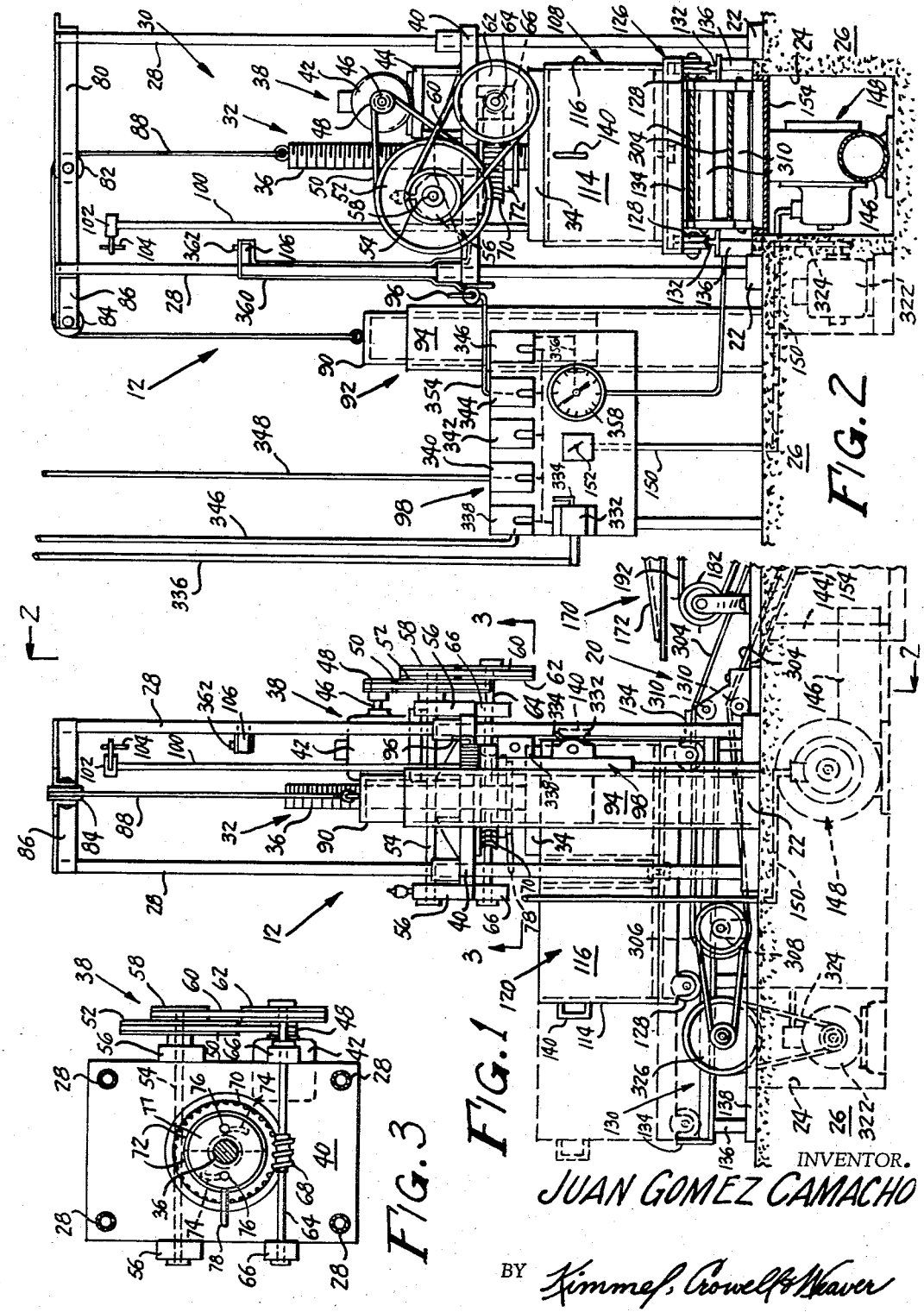
INVENTOR.
JUAN GOMEZ CAMACHO
BY Kimmel, Crowell & Weaver
ATTORNEYS.

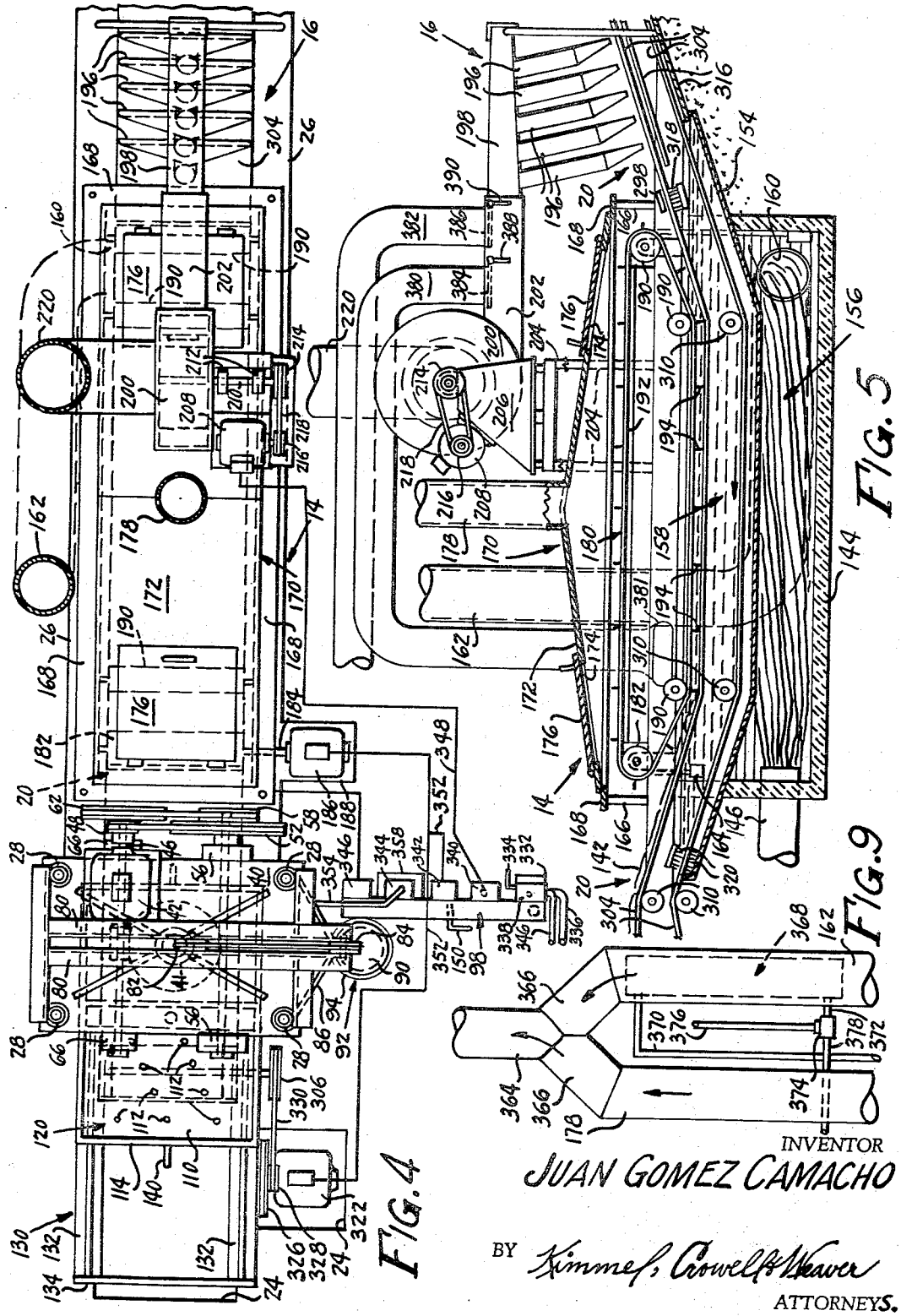

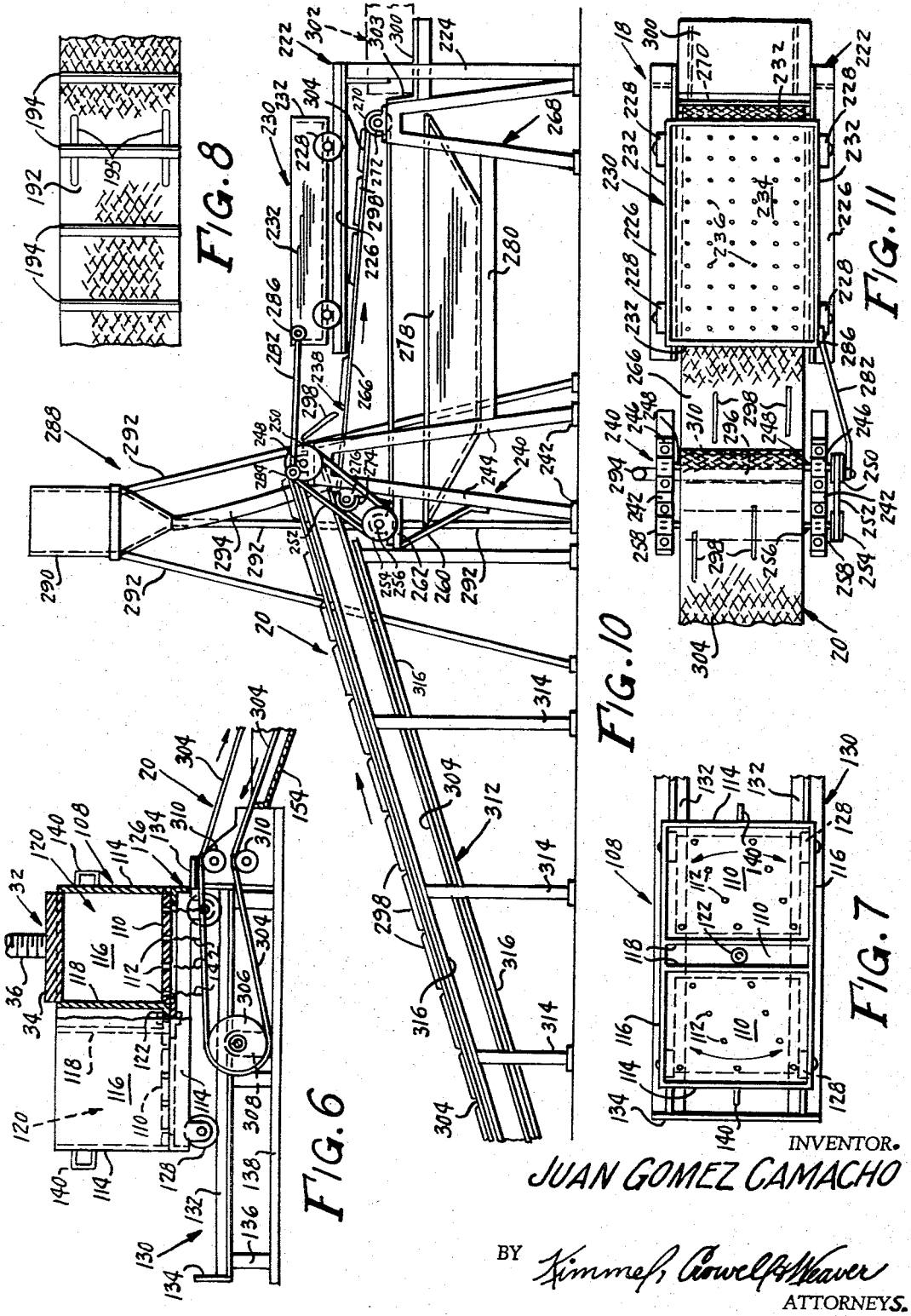

United States Patent Office 3,338,154
Patented Aug. 29, 1967

3,338,154
MACHINE FOR THE PRODUCTION OF
CHURROS AND SIMILAR FRITTERS
Juan Gomez Camacho, % Products Fiesta S.A., Oriente
32 3600, Col. Merced Balbuena, Mexico City 8, Mexico
Filed Oct. 1, 1965, Ser. No. 492,004
20 Claims. (Cl. 99—353)

ABSTRACT OF THE DISCLOSURE

A machine for cooking fritters comprising a continuous conveyor extending from a first side of a hot oil bath, downwardly into and through the hot oil bath and upwardly and out of the oil bath on a second side, a continuous cutting belt disposed to travel adjacent to the conveying belt in the hot oil bath for cutting continuous strips of dough in the oil bath and maintaining the cut strips in submerged and separated relation in the oil bath, a plunger press for extruding ribbons of dough onto the first end of the conveyor belt, and a vibrating tray at the other end of the conveyor belt for coating the cooked fritters with sugar.

---

This invention relates to an automatic machine for the production of "churros" and similar frittered products, such as "rancheritos" and the like, and constitutes a continuation-in-part of application Ser. No. 347,947, filed Feb. 27, 1964 (now abandoned).

Since most countries are undergoing population expansion, many complex industrial problems have been encountered in the supply of foodstuffs. It is well known that mechanization in agricultural environments has become necessary for the production of large crops and that automation of food processing plants has also become necessary to fill the needs of the population.

From what has been ascertained, it appears that the "churro" originated in Spain and that it has been classified within the fritting crafts, very much appreciated by the Latin race with large quantities thereof being consumed. A "churro" is a type of fritter, made with specially prepared dough, and is generally hexagonal or octagonal in cross-section and elongated much like spaghetti. Before cooking, a churro is much thicker than spaghetti and of varying lengths, which may be fried in oil to produce a coiled fritter. The pieces, when cut to a desired length, are rolled over granulated sugar and are made ready for sale or human consumption. On the other hand, a "rancherito" is a similar fritter made from a differently prepared dough and is macaroni-like although rather narrow, and which is salted, chillied and fried with the cooked fritter then being cut into very short pieces.

The techniques followed in the conventional manufacture of churros or the like consists in the preparation of a flour base dough to which salt, water and the flavoring essence is added. The mixture is then beaten into a very fine doughy consistency and then introduced into a large syringe which is provided with two diametrically opposed handles held by an operator while pressing the device against his chest. A plunger within the syringe ejects the dough therefrom into an elongate strip of generally hexagonal or octagonal configuration. The extruded strip of dough is then placed in an oil kettle and remains there until cooked. The fritter is then cut into pieces of various lengths and rolled over in granulated sugar and then sold or consumed.

The hereinbefore described procedure is well known in the art of manufacturing churros, but is not hygenic nor does it produce churros in large quantities. It requires an enormous number of operators, who have to perform heavy and laborious movements, such as the pressing of the syringe plunger against their chest to eject the dough strip of the churro. It will be apparent that the operators are exposed to the intense heat of the cooking kettle during the time spent in the production operation, which includes emptying the syringe, turning or rolling of the dough thread or strip within the cooking vessel, removing the cooked fritter, allowing the frying oil to drain therefrom, cutting the elongate fritter into shorter pieces and rolling them in the granulated sugar for sale.

A number of rudimentary machines have been devised heretofore which simplify only the physical effort exerted by the operator upon the plunger with the remaining steps of the production operation remaining the same with only minor variations such as by cutting the elongate cooked dough thread into pieces by means of a metal blade or even by using the fingers. Little effort has been taken to eliminate the combustion gases which bring about poor flavor in the product and little has been done to improve the cleanliness of the process.

It is a primary object of the instant invention to provide an apparatus for the production of cooked fritters which is sanitary in operation and which produces a high quality product in great quantities.

Another object of the instant invention is to provide an apparatus for the manufacture of cooked fritters requiring a minimal amount of human contact thereby reducing manpower and expense and promoting sanitation of the process and uniformity of the product.

Still another object of the instant invention is the provision of an apparatus for the manufacture of cooked fritters providing means for automatically severing the elongate cooked fritter into pieces of desired lengths.

A further object of the instant invention is the provision of an apparatus of the character described wherein the elongate dough thread is cooked equally from all sides enhancing consumer appeal to the finished product.

A still further object of the instant invention is to provide an apparatus for cooking fritters including means obviating the contamination of the product by combustion gases.

A still further object of the instant invention is to provide an apparatus for the manufacture of fritters and like articles fried in oil including means for automatically draining the cooked product.

Other objects and advantages of the instant invention, as well as the invention itself, reside in the combinations of elements, arrangements of parts, and features of construction and operation, all as will be more fully pointed out hereinafter and disclosed in the accompanying drawings wherein there is shown a preferred embodiment of this inventive concept.

In the drawings:

FIGURE 1 is a fragmentary side elevational view of the device of the instant invention illustrating the input end thereof;

FIGURE 2 is a transverse cross-sectional view of the fritter making machine of FIGURE 1 taken substantially along line 2—2 thereof viewing in the direction of the arrows and illustrating the input end thereof;

FIGURE 3 is a horizontal cross-sectional view of the device of FIGURES 1 and 2 taken substantially along line 3—3 thereof viewing in the direction of the arrows illustrating a drive mechanism for the dough dispensing apparatus;

FIGURE 4 is a partial top elevational view of the device of the instant invention, illustrating from left to right, an input end, a cooking chamber, and a oil draining means on the right leading to a sugaring device shown hereinafter;

FIGURE 5 is a representative view of the cooking chamber and drying means of FIGURE 4, certain parts being broken away for clarity of illustration;

FIGURE 6 is an enlarged view of the dough feeding apparatus positioned at the input end of the device of FIGURE 4, certain parts being broken away for clarity of illustration;

FIGURE 7 is a top plan view view of the device of FIGURE 6, the plunger having been omitted for purposes of illustration;

FIGURE 8 is an enlarged view of the cutting device positioned within the cooking chamber of FIGURE 5 for severing the cooked fritter into a plurality of desired units;

FIGURE 9 is a side elevational view of the exhaust conduits leading from the cooking chamber of FIGURE 5;

FIGURE 10 is a side elevational view of the surgaring apparatus of the instant invention which is connected in material exchanging relation with a conveyor leading from the drying means of FIGURE 4; and FIGURE 11 is a partial top elevational view of the conveyor and sugaring apparatus of FIGURE 10.

Referring now to the drawings in detail, wherein like reference characters designate like elements throughout the several views threof, there is indicated generally at 10 a fritter production machine having as its major components a dough extrusion device shown generally at 12 positioned at the input end of device 10, a cooking chamber designated generally at 14, a drying means designated generally at 16, a sugaring means shown generally at 18 at the output end of device 10 with a conveyor belt designated generally at 20 providing a means for transporting the uncooked article from dough extruder 12 through cooking chamber 14 and drying means 16 to sugaring means 18.

Referring now to FIGURES 4 and 10 for a brief summary of the operation of the instant invention, dough extruder 12 may be selectively or continuously actuated to deliver a plurality of dough strips onto conveyor belt 20 which transmits the dough threads through cooking chamber 14 where the dough is cooked and severed into a plurality of pieces of desired length. The rate of movement of conveyor means 20 is such that the fritters will be adequately cooked upon exiting from cooking chamber 14. The fritters will be partially air dried by drying means 16, as may be seen most clearly in FIGURE 5, with additional drainage taking place during the upwardly inclined travel thereof as may be seen in FIGURE 10. Conveyor belt 20 will deliver the cooked fritters to sugaring apparatus 18 where they will be sprinkled with granulated sugar and propelled toward the outlet end of device 10 for packaging.

Dough Extruder

Referring now to FIGURES 1 and 2, dough extruder 12 includes a pair of horizontal supports 22 straddling a pit 24 made of concrete or the like. Extruding vertically from supports 22 are a plurality of beams 28 forming a central well 30 in which reciprocates a plunger or press shown generally at 32. Plunger 32 includes a plunger plate 34 to which is vertically attached a threaded shank 36 as may be seen in FIGURE 6, as well as in FIGURES 1 and 2.

A plunger drive mechanism shown generally at 38 includes a stationary plate 40 providing a collar 41 slidably receiving shank 36 and fixedly secured about beams 28 as may be seen in FIGURE 3. An electric motor 42 is mounted on plate 40 by a suitable stand 44 and includes a drive shaft 46 carrying a drive pulley 48. An endless belt 50 connects drive pulley 48 and an idler pulley 52 mounted on an idler shaft 54 rotatably mounted in bearing blocks 56 secured to plate 40. Idler shaft 54 fixedly carries a smaller pulley 58 connected by an endless belt 60 to a driven pulley 62. A driven shaft 64 is mounted by a pair of journals 66 to the underside of plate 40 and carries a worm 68 as may be seen most clearly in FIGURE 3.

It will be seen that the delivery of electrical energy to motor 42 will result in a rotation of drive pulley 48 rotating idler pulleys 52, 58 through the movement of endless belt 50. Endless belt 60 will transmit the rotary movement of idler pulley 58 to driven pulley 62 resulting in the rotation of worm 68 in a known manner. It should be apparent that the relative sizes of pulleys 48, 52, 58, 62 may be varied to create the appropriate mechanical advantage. Likewise, a conventional belt tightener may be provided to insure proper tension for endless belts 50, 62.

A worm gear 70 is in operative engagement with worm 68 and includes an unthreaded opening receiving threaded shank 36 therethrough. Positioned under worm gear 70 are a pair of half-cylindrical connectors 72 having a threaded opening therethrough receiving threaded shank 36. Connectors 72 form a pair of arcuate camming slots 74 in each of which resides a drive pin 76 connected to an operating disc 77 with any suitable mechanism holding worm gear 70 and connectors 72 into the position shown in FIGURE 2. Disc 77 is provided with a handle 78 for rotating disc 77 in a direction opposite from that caused by worm 68 in order to rotate drive pins 76 in slots 74 thereby disengaging threaded connectors 72 from threaded shank 36.

In order to move plunger 32 from a depressed position at the end of an extruding cycle to an elevated position in preparation for the next extruding cycle, a cross piece 80 is provided on the upper ends of beams 28 rotatably carrying a pulley 82 with a second pulley 84 being positioned on a brace 86 secured to beams 28. A rope 88 is fastened onto the upper end of threaded shank 36, looped about pulleys 82, 84 and fixedly secured to a first telescoping cylinder 90 of a vacuum return means shown generally at 92. Vacuum return means 92 includes a second enlarged cylinder 94 closely receiving first cylinder 90 with suitable gasket means being placed at the interface thereof for preserving a vacuum created in returning means 92.

Electric motor 42 is preferably connected to a source of electrical energy as more fully explained hereinafter by an electric circuit including a closing switch 96 positioned at or adjacent a control panel designated generally at 98. When it is desired to begin the downward travel of plunger 32, it is necessary to manipulate handle 78 to engage connectors 72 with threaded shank 36 and close switch 96. The rotation of worm gear 68, worm wheel 70 and connectors 72 will drivingly rotate threaded shank 36 as previously explained.

Since it is desirable to provide an automatic shut-off for motor 42, an elongate shaft 100 is fixedly secured to the upper surface of plunger plate 34 and carries a slidably mounted connector 102 providing a switch-actuating probe 104 thereon. An abutment 106 is positioned on braces 28 and carries a cut-off switch for the circuit leading to electric motor 42. It will be seen that the downward reciprocation of plunger 32 will result in a similar travel of probe 104. When probe 104 contacts the switch positioned on abutment 106, electric motor 42 will cease movement at which time the operator may grasp handle 78 of worm gear 70 and disengage connectors 72. It will be seen that the positioning of connector 102 at any desired location along shaft 100 allows for any desired movement of plunger 32.

When connectors 72 release plunger 32, the vacuum induced in return means 92 will cooperate with the atmospheric pressure exterior thereof to reciprocate first cylinder 90 downwardly in second cylinder 94 thus retracting plunger 32. It should be apparent, however, that any suitable plunger retracting means may be provided, such as a weight in the position of return means 92.

Referring now to FIGURES 6 and 7 in addition to FIGURES 1 and 2, there is indicated generally at 108 a dough receptacle having a bottom wall 110 forming a plurality of extrusion apertures 112 which may be octagonal or hexagonal to form churros, or circular, as the requirements of the end product dictate. Receptacle 108 also includes a pair of end walls 114 and a pair of side walls 116 with a pair of interiorly mounted and spaced apart partitions 118 completing a pair of open top dough compartments indicated generally at 120. Bottom wall 110 is rotatably mounted by a pivot pin 122 on a cross-bar 124 of a vehicle indicated generally at 126 carrying a plurality of rotatable wheels 128. Vehicle 126 may be reciprocated upon a track indicated generally at 130 providing a pair of spaced apart rails 132 receiving wheels 128 and provided with a pair of stop plates 134 at each end thereof. As may be seen in FIGURES 1 and 2, track 130 is positioned such that the forward end thereof is directly under plunger 32 with track 130 being spaced from foundation 26 by a plurality of supports 136 and a platform 138.

In the operation of dough extruder 12, dough receptacle 108 will be moved to the dotted line position shown in FIGURE 1 with rightmost dough compartment 120 being filled with dough suitable for the manufacture of churros. Dough receptacle 108 includes a suitable handle 140 at each end which an attendant may grasp and push receptacle 108 forwardly such that rightmost compartment 120 underlies plunger 32. Plunger 32 may then be actuated to fit within compartment 120, as may be seen in FIGURE 6, thus extruding a plurality of dough strips 142 onto conveyor belt means 20. While plunger 32 is evacuating rightmost dough compartment 120, the attendant will fill leftmost compartment 120 with dough previously mixed. When plunger 32 has evacuated the first dough compartment, the attendant may retract plunger 32 as previously mentioned and pull dough receptacle 108 rearwardly. After pulling receptacle 108 rearwardly, the attendant may rotate compartment 120 about pivot pin 122 with respect to vehicle 126 such that the empty compartment may reside on the left and the full one on the right as may be seen in FIGURE 1. The attendant may then actuate plunger 32 starting another extruding cycle at which time he will fill empty compartment 120.

As previously mentioned, and as may be seen in FIGURE 6, conveyor belt means 20 is positioned in material exchanging relation with respect to extrusion apertures 112 of dough compartment 120 for conveying a plurality of dough strips 142 into cooking chamber or hot oil bath means 14. A minute description of conveyor belt means 20 will be postponed because of the relationship thereof with respect to additional components not hereinbefore enumerated.

Cooking chamber

Cooking chamber 14 includes a concrete liner or the like 144 communicating through a conduit 146 to a burner and blower unit shown generally at 148 in FIGURES 1 and 2. Burner and blower unit 148 may be of any conventional type, such as a gas, butane, or oil burning device connected by a fuel delivery line 150 to control panel 98 where an attendant may control the heat energy delivered to cooking chamber 14 or where the same may be automatically controlled by a valve 152 positioned in fuel delivery line 150. A partition wall 154 divides liner 144 into a combustion chamber designated generally at 156 and a hot oil bath means designated generally at 158 as may be seen in FIGURE 9. Spent combustion gases may exit through an opening 160 below partition wall 154 and be conducted by a flue pipe 162 to the atmosphere thus avoiding the contamination of the cooking fritters with combustion products. Accordingly, the resultant product will be more pleasant in taste and more uniform in quality.

Hot oil bath 158 is preferably filled with a frying oil of any conventional type and carries a temperature sensor which may be connected to control valve 152 on control panel 98 for automatically controlling the delivery of combustible fuel to burner 148 in much the same manner that a thermostat controls the heat delivered by an oil furnace utilized in homes. Cooking chamber 14 also includes a pair of end walls 166 supported from concrete liner 114 and carrying a peripheral horizontal flange 168 on which resides a hood shown generally at 170. Hood 170 includes a pair of upwardly converging top walls 172 forming suitable openings 174 closed by movably mounted hatches 176 providing ingress into hot oil bath 158. A conduit 178 is connected at the apex of top walls 172 for venting the vaporized oils within hot oil bath 158 to the atmosphere.

Positioned interiorly of hot oil bath 158 is an automatic cutting means 180 including a drive roller 182 rotatably mounted between the sides of cooking chamber 14 substantially above partition wall 154 drivingly connected to a drive shaft 184 of an electric motor 186 positioned on a platform 188 on the side thereof. Also rotatably mounted between the sides of cooking chamber 14 rotating transversely to the longitudinal axis thereof are a plurality of idler rollers 190, it being understood that any suitable number may be employed. Wound about drive roller 182 and idler rollers 190 is a suitably tensioned endless belt 192 which may be seen in greater detail in FIGURE 8.

Belt 192 is preferably perforate and carries a plurality of cutting bars 194 spaced longitudinally apart. Cutting bars 194 may be secured to belt 192 by any suitable fastening means, such as bolts, rivets, glue or the like, but it is preferred that an adjustable type of connecting means be used in order to vary the length of the fritters emitting from cooking chamber 14. This may be done by providing a longitudinal slot 195 in belt 192 with a frictional fastener extending therethrough and secured to the other side of belt 192. As will be explained more fully hereinafter in conjunction with the description of conveyor belt means 20, belt 192 and the adjacent conveyor belt transmitting the elongate dough strips will move in the same direction and at the same rate and are closely juxtaposed such that cutting blades 194 sever the elongate strip into a plurality of desirably sized pieces. As will be apparent to one skilled in the art, the length of hot oil bath 158 and the rate of advancement of conveyor means 20 will be designed such that the fritters emitting therefrom are adequately cooked.

Drying means

Drying means 16 includes a plurality of air outlets 196 positioned adjacent conveyor belt means 20 at the exit from cooking chamber 14 connected to a delivery conduit 198 in fluid communication with a centrifugal fan 200 through an output connection 202. Centrifugal fan 200 is illustrated as mounted over hood 170 of cooking chamber 14, although it should be understood that it may be mounted in any suitable location, by a plurality of upstanding means 204 carrying a mounting bracket 206 to which is secured an electric or internal combustion motor 208 drivingly engaged to fan 200 by a fan 210 rotatably mounted in journals 212, a pulley 214 rigidly mounted on fan shaft 210, a pulley 216 fixedly mounted on a drive shaft of motor 208 with a tensioned endless belt 218 connecting pulleys 214, 216 in a conventional manner.

It will be seen that the energization of motor 208 will result in the rotation of fan shaft 210 and consequently fan 200 to induct atmospheric gases through an inlet conduit 220. Pressurized air will be expelled through output connection 202 and delivery conduit 198 to air outlets 196. It will be readily apparent that cooked fritters emitting from cooking chamber 14 will be wet with cooking oil which drying means 16 facilitates in removing. It is thought that several cooperating factors aid in the drying of the cooked fritters, including the gravitational flow of the adhered cooking oil, the evaporation thereof enhanced by the rapid movement of air from outlets 196 and the physical dislogement of adhered liquids resulting from the impact of gases emitting from air outlets 196.

Sugaring means

Referring now to FIGURES 10 and 11, conveyor belt means 20 will transport the cooked fritters up a small incline to sugaring means 18 which may be of any desirable type, but which is illustrated as including an L-shape frame indicated generally at 222 having a pair of substantially vertical posts 224 carrying a pair of laterally disposed parallel horizontal rails 226 receiving a plurality of wheels 228 of sugar carying vehicle designated generally at 230. Sugar carrying vehicle 230 is illustrated as including four sugar retaining walls 232 forming a substantially rectangular box and a bottom wall 234 providing a plurality of apertures 236 through which a granulated sugar product may pass.

A belt conveyor designated generally at 238 is in fritter receiving relation with respect to conveyor means 20 and transports cooked fritters 298 beneath sugar vehicle 230 such that the granulated material passing through apertures 236 may be sugar-dusted or powdered. Suger conveyor 236 includes a pair of first A-frames 240 having ground engaging bases 242 and a pair of upwardly converging structural supports 244 mounting a bearing 246 at the upper end thereof rotatably receiving a shaft 248 on the end of which is mounted a suitable pulley 250. Pulley 250 is connected by a suitable endless belt 252 to a driven pulley 254 affixed to an elongated shaft 256 mounted in spaced apart journals 258 onto A-frames 240 by a pair of braces 260 and platforms 262.

A frictional roller 264 is fixedly mounted on shaft 256 underlying the terminal end of conveyor means 20 and receives therearound an imperforate endless conveyor belt 266. Mounting belt 266 underneath sugar carrying vehicle 230 is another pair of A-frames indicated generally at 268 of lesser height than A-frames 240 carrying a roller 270 in a suitable journal 272. The upper surface of endless belt 266 is positioned in a downwardly inclined attitude by an idler roller 274 mounted by a journal 276 onto A-frame 240.

Oscillating sugar vehicle 230 in order to provide a substantial flow of sugar onto the fritters passing under vehicle 230 is a substantially rigid bar 282 connecting pulley 250 and vehicle 230. One end of rigid bar 282 is eccentrically pivotally mounted on pulley 250 by a pivot connection 284 with the other end thereof being pivotally mounted on wall 232 of vehicle 230. It will be apparent that the rotation of pulley 250 will transmit an oscillatory motion to vehicle 230 which may travel on rails 226.

It should be apparent that cart 230 will apply sugar only to the upper surface of the fritters passing thereunder. Since it is desirable to apply sugar to all sides of the cooked fritter, an additional sugar dispensing device is designated generally at 288 including a receptacle 290 supported a substantial distance from the underlying ground surface by a plurality of supports 292. Sugar receptacle 290 is connected by a sugar passing conduit 294 to a sugar dispensing tube 296 positioned transversely of the movement of belt 266 adjacent roller 274. It will be apparent that the flow of sugar through conduit 294 and dispensing tube 296 will deposit a substantial quantity of sugar on imperforate belt 266. When fritter pieces 298 are discharged by conveyor belt means 20 onto perforate belt 266, they will fall onto the bed of sugar thereon and will be transported under sugar vehicle 230 to be appropriately covered.

As may be seen in FIGURE 10, imperforate belt 266 will discharge churros 298 onto a horizontal plate 300 which is juxtaposed to the inlet end of a packaging means indicated generally at 302. A diagonal plate 303 is spaced a slight distance from the outlet end of belt conveyor 238 such that sugar residing on imperforate belt 266 will be discharged into an open topped receptacle 278. Receptacle 278 is removably positioned between A-frames 240, 268 by a cross bar extending therebetween. It should be apparent that some sugar emitting from sugar vehicle 230 and receptacle 290 will not adhere to fritters 298 and may pass from belt 266 through the opening adjacent diagonal plate 304 into receptacle 278.

*Conveyor belt means*

Conveyor belt means 20 includes an elongated perforate belt 304 tensioned about a driver roller 306 rotatably mounted by a journal 308 onto platform 138 of vehicle track 130 and a plurality of idler rollers 310. For purposes of clarity, the description of perforate belt 304 will proceed from adjacent the inlet end of fritter production machine through cooking chamber 14 and drying means 16 to sugaring means 18 with a description following of the return movement.

As may be seen in FIGURE 6, perforate belt 304 underlies rightmost dough compartment 120 in material receiving relation therewith such that dough strips 142 reside on belt 304. As belt 304 enters cooking chamber 14, a downward angle is produced by the juxtaposition of belt 192 and idler rollers 190 as may be seen in FIGURE 5. When belt 304 exits from cooking chamber 14, an upward angle thereof is achieved by the vertical placement of terminal idler roller 310 about shaft 248 as may be seen in FIGURES 10 and 11.

A cooking oil recovery means is shown generally at 312 in FIGURE 10 for accumulating and transmitting cooking oil recovered from fritters 298 back into hot oil bath 158. Oil recovery means 312 includes a plurality of vertical supports 314 spaced laterally of belt 304 and carries a pair of elongate plates 316 underlying and spaced slightly from both courses of belt 304. Since belt 304 is foraminous, cooking oil blown from fritters 298 by drying means 16 will pass through belt 304 to reside on plate 316. Since plates 316 are upwardly inclined with respect to oil bath 158, cooking oil blown from fritters 298 or gravitationally moved therefrom will flow into cooking chamber 116 as may be seen in FIGURE 5. A wiper 318 may be secured to the sides of cooking chamber 14 contacting the lower surface of belt 308 above the body of cooking oil in order to partially remove adhering liquids from belt 304.

Belt 304 will pass over terminal roller 310 as may be seen in FIGURE 11 discharging fritters 298 onto imperforate belt 266 as previously explained. Belt 304 will then pass between plates 316 with any drippage accumulating on the lowermost plate thereof. Belt 304 then enters cooking chamber 14 at the outlet end thereof and passes under idler rollers 310 and through a pair of wipers 320 positioned where belt 304 exits hot oil bath 158.

Driving roller 306 and consequently belt 304 is a motor 322 which may be of the electric or internal combustion type driving a conventional pulley in engagement with an endless belt 324 as may be seen in FIGURES 1 and 2. Belt 324 is wound about an idler pulley 326 journaled for rotation of platform 138. As may be seen most clearly in FIGURE 4, idler pulley 326 carries a smaller pulley 328 about which is wound a drive belt 330 residing in a circumferential groove in drive roller 306.

*Electrical controls*

Control panel 98 includes a main switch 332 having an operating handle 334 connecting an electrical conduit 336 to a power source (not shown) in order to energize a plurality of electrical circuits leading to the prime movers of fritter production device 10 through a multiplicity of switches 338, 340, 342, 344, 346. Switch 338 is connected by an electrical conduit 348 to a suitable mechanical dough mixer (not shown) adjacent the inlet of machine 10 for mixing dough in a known manner.

Switch 340 is connected by an electrical wire 350 to electric motor 208 driving fan 200 of drying means 16. Switch 342 is connected by another wire 352 leading to both motor 322 of conveyor belt means 20 and to motor 186 of cutting means 180 for simultaneously driving belts 304, 192 in the same direction, although it should be understood that motor 322 may drive belt 192 by the introduction of another endless belt between rollers 306, 182. Switch 344 is connected by still another wire 352 to switch 96 leading to plunger drive mechanism 38. Switch 346 and electrical conduit 356 connect electrical power to a thermometer 358 and temperature sensor 164, although it should be understood that a sensor 164 is connected with control valve 152 as previously mentioned to regulate the temperature of hot oil bath 158.

It is believed that the operation of the electrical controls previously mentioned is evident with the only possible difficulty residing in the actuation of plunger drive mechanism 38 and the automatic deactuation thereof. It will be seen that the opening of main switch 332 delivers electrical potential to each of switches 338, 340, 342, 344, 346. As may be seen in FIGURE 2, the closing of switch 344 will deliver electrical energy through wire 354 and switch 96 to line 360 in which is positioned a "push-to-open" cut-off switch 362 with line 360 leading to motor 42. It will be seen that the downward movement of plunger 32 will result in contact between probe 304 and cut-off switch 362 thus de-energizing motor 42 and halting the downward movement of plunger 32.

*Air systems*

Referring now to FIGURE 9, it is seen that flue conduits 162, 174 are connected to a chimney 364 by a pair of 45° elbows 366. Conduits 162, 178 and chimney 364 are preferably designed such that the draft thereof will readily extract flue products from cooking chamber 14, although it should be understood that a large centrifugal fan may be positioned within chimney 364 if a draft is impracticable.

Positioned within flue 162 is a heat-exchanger indicated generally at 368 having a water input passageway 370 and a water outlet passageway 372 in which is positioned a valve 374 directing fluid to one of water distribution lines 376, 378. It should be apparent that warmed or heated water is often necessary in the operation of device 10, such as may be required in the mixing of dough or the cleaning of various utensils utilized in the production of fritters in accordance with the above description. It will be seen that heat-exchanger 368 is of the countercurrent liquid-gas type utilizing the heat of combustion products within combustion chamber 156.

Referring now to FIGURE 5, a pair of air conduits 380, 382, are in communication with output connection 202 of centrifugal fan 200. A flap valve 384, 386 is associated with each of conduits 380, 382 and may be manipulated by a valve handle 388, 390 for selectively delivering a moving stream of air into either or both of conduits 380, 382.

Conduit 380 is preferably in fluid communication with the interior hot oil bath 158 above the fluid line, shown at 381, therein in order to cool the hot cooking oil upon the termination of production of device 10 for any reason. It will be apparent that hot cooking oil is a substantial fire hazard with a moving stream of air through conduit 380 acting to cool the same. Conduit 382 preferably leads to the dough mixing operation for conventional purposes.

*Summary of operation*

An attendant will close main switch 332 by manipulating handle 334 to deliver electrical power to each of the switches shown in FIGURE 2 and will close switch 338 to deliver electrical power to a dough mixing device (not shown) through conduit 346. While dough is being mixed, the attendant may fill oil bath 158 with a suitable cooking oil and start heater 148 in a conventional manner to deliver combustible fuel thereto through fuel delivery line 150. When the temperature within oil bath 158 has arisen to a suitable level and when the preparation of dough is completed, the attendant will fill receptacles 120 and position the rightmost one under plunger 32 as may be seen in FIGURE 1.

The attendant will then engage connectors 72 with threaded shank 36 of plunger 32 by manipulating handle 78 of disc 77. Switches 340, 342 will then be closed to deliver electrical energy to prime movers 186, 208, 322 for operating drying means 16 and propelling cutting means 180 and conveyor belt means 20.

Switches 96, 344 will then be closed to start the downward travel of plunger 32. When plunger 32 contacts the dough within rightmost receptacle 120, a plurality of dough strips 142 will be extruded moving conveyor belt 304. The elongate continuous dough strips will be transported into heated oil bath 158 where they will be severed into commercially usable pieces by cutting bars 194 of cutting means 180. Since belt 192 of cutting means 180 travels in the same direction as belt 304 and at the same speed, it will be seen that there is little opportunity for inadvertent multiple severance of strips 142. Additionally, it should be pointed out that perforate belt 192 overlies the cooking fritters substantially containing them in a predetermined cooking area.

When fritters 298 emit from oil bath 158, wiper 318 will remove a substantial portion of the cooking oil adhering to the underside of belt 304 with drying means 16 delivering a substantial quantity of moving air through air outlets 196 impinging upon fritters 298 simultaneously cooling and drying them. Cooking oil dislodged from fritters 298 will pass through perforate belt 304 and may drain into oil bath 158 along plates 316.

When fritters 298 pass over terminal roller 310, as may be seen in FIGURES 10 and 11, they will fall onto sugared imperforate conveyor belt 266 and pass under sugaring vehicle 230 where they will be thoroughly covered. Each of fritters 298 will then pass onto outlet plate 300 into packaging means 302 where they may be packaged in a conventional manner.

It will be noted that one attendant is required for the filling of receptacles 120 with dough and for operating plunger 32 while another attendant is probably required to operate packaging means 302. Although the description of the fritter making process has utilized the powdering of fritters 298 with sugar after the cooking thereof, it should be understood that rancheritos may be made by powdering dough strips 142 prior to entry within oil bath 158.

It is now seen that there is herein provided an improved apparatus for the production of churros and similar fritters having all of the objects of this invention and others, including many advantages of great practical utility and commercial importance.

Since many embodiments may be made of the instant inventive concept and since many modifications may be made of the embodiment hereinbefore shown and described, it is to be understood that the foregoing is to be interpreted merely as illustrative and not in a limiting sense.

I claim:

1. A machine for the production of churros and the like comprising a dough receptacle having extrusion orifices in its bottom portion, an energized reciprocating press including energized plunger means operably coacting with said receptacle to extrude dough through said orifices, heated oil bath means, a continuous energizable conveyor belt means adapted to receive said extruded dough from said receptacle, to selectively convey said extruded dough downwardly through said heated oil bath means and to convey said cooked dough upwardly from said oil bath, cutter means coacting with said conveyor belt means in said oil bath means to cut said extruded dough into commercial lengths, and means for dispensing sugar and desired culinary ingredients over the cooked churros.

2. A machine for the production of churros and the like, as in claim 1, wherein said cutter means includes an endless belt a bottom portion of which moves within said oil bath means carrying a plurality of cutting blades coacting with said conveyor belt means for cutting said extruded dough into said commercial lengths and maintaining said cut dough submerged in said oil bath means and said lengths separated from each other during cooking thereof.

3. A machine for the production of churros, fritters and the like as in claim 2, wherein said energized plunger means includes motor means and releasable gear means for helically energizing said plunger means to extrude dough threads from said dough receptacle.

4. A machine for the production of churros and the like, as in claim 3, including oil burner means and automatic temperature controlling means for said burner means for heating the oil bath means for consistently and uniformly cooking the churro dough into edible and tasty churros.

5. A machine for the production of churros and the like, as in claim 1, wherein said dough receptacle contains at least two dough compartments so that when said plunger means is extruding dough from one compartment therein the machine operator may be replacing and mixing dough ingredients in the other compartment of the container to insure substantially uninterrupted use of the machine of the class described.

6. A machine for the production of fritters and the like comprising a dough receptacle having extrusion orifice means therein, helicoid actuated press means operably coacting with said receptacle to extrude dough therein through said orifices forming dough threads; heated oil bath means, selectively energized conveyor belt means adapted to selectively receive said extruded dough from said receptacle and selectively convey said extruded dough through said heated oil bath means, cutter means in the oil bath coacting with said conveyor belt means to cut said threads of extruded dough into commercial churro lengths, said conveyor belt means being further adapted to convey said dough after being cooked into churros from said oil bath, and a continuously vibratable tray which includes a foraminous bottom disposed for dispensing sugar and the like condiments over the cooked churros.

7. A machine for the production of churros and the like as in claim 6, wherein said helicoid press means includes energizing motor means and releasable coacting gear means for periodically and selectively operating said press means.

8. A machine for the production of churros and the like, as in claim 7, wherein said conveyor belt means comprises means for returning the oil drippings from the dried churros to said heated oil bath means.

9. An apparatus for the production of cooked fritters comprising a dough receptacle having a wall forming at least one extrusion orifice, energizable plunger means operably coacting with said receptacle to extrude dough through said orifice, heated oil bath means, a continuous conveyor belt extending from a first side of said oil bath means, where said belt is disposed in material receiving relation with said extrusion orifice, downwardly through said oil bath means and upwardly therefrom to a second side of said oil bath means, a continuous cutting belt including a foraminous belt and knives extending therefrom disposed to travel through said oil bath means adjacent to said conveyor belt with said knives extending into proximity to said conveyor belt for cutting continuous ribbons of dough into fritters and maintaining said fritters submerged and separated from each other in said oil bath means during cooking thereof, and means for dispensing powdered culinary ingredients upon the cooked fritters.

10. The structure of claim 9 wherein said dough receptacle includes at least a pair of compartments, means mounting said receptacle for movement so that when said plunger means is extruding dough from one compartment an attendant may be filling said other compartment to insure substantially uninterrupted use of said apparatus.

11. The structure of claim 10 wherein said mounting means includes means for rotating said dough receptacle.

12. The structure of claim 11 wherein said mounting means includes means for linearly reciprocating said dough receptacle.

13. The structure of claim 9 wherein said dispensing means includes means for powdering the upper and lower surfaces of said fritter lengths.

14. The structure of claim 9 wherein said conveyor belt means includes means for drying said cooked fritters including at least one elongate plate underlying said conveyor belt means in material discharging relation with said heated oil bath means.

15. The structure of claim 14 wherein said drying means includes means for forcibly delivering a stream of air on said conveyor belt means.

16. The structure of claim 9 wherein said energizable plunger means includes a plunger plate configured to be closely received by said receptacle, an upstanding threaded shank carried by said plate, a motor, and means operably connecting said motor and said shank for threadably advancing said shank including means for selectively grasping and releasing said threaded shank.

17. The structure of claim 9 wherein said conveyor belt means includes an endless belt, means mounting said endless belt on each side of said oil bath means for moving said belt in a closed path so that half of said belt moves in a first direction and the other half of said belt moves in an opposite direction, said oil bath means surrounding a central portion of said belt including at least a portion of said belt moving in said first direction and at least a portion of said belt moving in said opposite direction.

18. The structure of claim 9 including means for forcibly delivering a stream of air onto said lengths emitting from said oil bath means.

19. The structure of claim 18 wherein said air delivery means includes means for selectively forcibly delivering a stream of air into said oil bath means for cooling said hot oil bath.

20. The structure of claim 9 including a combustion chamber juxtaposed to said hot oil bath means, means for delivering a stream of combustible fuel into said combustion chamber, means for venting said combustion chamber to the atmosphere bypassing said oil bath means.

References Cited

UNITED STATES PATENTS

| | | | |
|---|---|---|---|
| 319,684 | 6/1885 | Euston | 222—161 |
| 625,696 | 5/1899 | Perky. | |
| 1,015,790 | 1/1912 | Dern | 83—326 |
| 1,598,435 | 8/1926 | Gottschalk | 99—405 |
| 1,781,411 | 11/1930 | Reiber. | |
| 1,821,689 | 9/1931 | Broeg. | |
| 1,933,557 | 11/1933 | Kalvin. | |
| 2,262,988 | 11/1941 | Brown et al. | 83—326 X |
| 2,286,644 | 6/1942 | Pringle et al. | 99—355 X |
| 2,549,283 | 4/1951 | Ashton | 99—405 X |
| 2,775,931 | 1/1957 | Messinger | 100—289 |
| 2,811,914 | 11/1957 | Chironis | 99—404 X |
| 2,833,203 | 5/1958 | Benson et al. | 99—404 |
| 2,926,597 | 3/1960 | Porambo | 99—353 |
| 3,132,949 | 5/1964 | Crowe | 99—353 X |
| 3,203,341 | 8/1965 | Hedgepeth | 99—330 |

FOREIGN PATENTS 679,165   7/1939   Germany.

BILLY J. WILHITE, *Primary Examiner.*